United States Patent [19]
Bennett et al.

[11] Patent Number: 4,813,988
[45] Date of Patent: Mar. 21, 1989

[54] SUITABLE DISTILLATION COLUMN PACKING FOR THE CRYOGENIC SEPARATION OF AIR

[75] Inventors: Douglas L. Bennett, Allentown; Keith A. Ludwig, Emmaus; Andrew J. Patrylak, Wescosville; John Zabrenski, Allentown, all of Pa.

[73] Assignee: Air Products and Chemicals, Inc., Allentown, Pa.

[21] Appl. No.: 197,555

[22] Filed: May 23, 1988

Related U.S. Application Data

[63] Continuation of Ser. No. 132,515, Dec. 14, 1987, abandoned.

[51] Int. Cl.⁴ ................................................ F25J 3/00
[52] U.S. Cl. ............................................ 62/18; 55/74
[58] Field of Search ..................... 62/18; 55/74, 387

[56] References Cited
PUBLICATIONS

"Code of Practice for the Design and Operation of Centrifugal Liquid Oxygen Pumps", Industrial Gases Committee, IGC Document, 11/82.
"Fire Tests on Centrifugal Pumps for Liquid Oxygen", Cryogenics, Jun. 1970, by: Bauer et al.
"Fire Tests on Centrifugal Pumps for Liquid Oxygen-Part 2", Cryogenics, Dec. 1971, by: Bauer et al.

Primary Examiner—Ronald C. Capossela
Attorney, Agent, or Firm—Willard Jones, II; James C. Simmons; William F. Marsh

[57] ABSTRACT

This invention relates to a process for the cryogenic separation of oxygen-containing mixtures to produce an enriched product whereby oxygen concentrations greater than 21% by volume are achieved in the process via passing streams of liquid and vapor countercurrently through a mass transfer zone which contains packing elements fabricated from a material having a thickness of less than about 1 millimeter, having a copper concentration of at least about 30% by weight and a heat of combustion of less than 1.0 Kcal/g, thereby avoiding the risk of flammability.

10 Claims, 5 Drawing Sheets

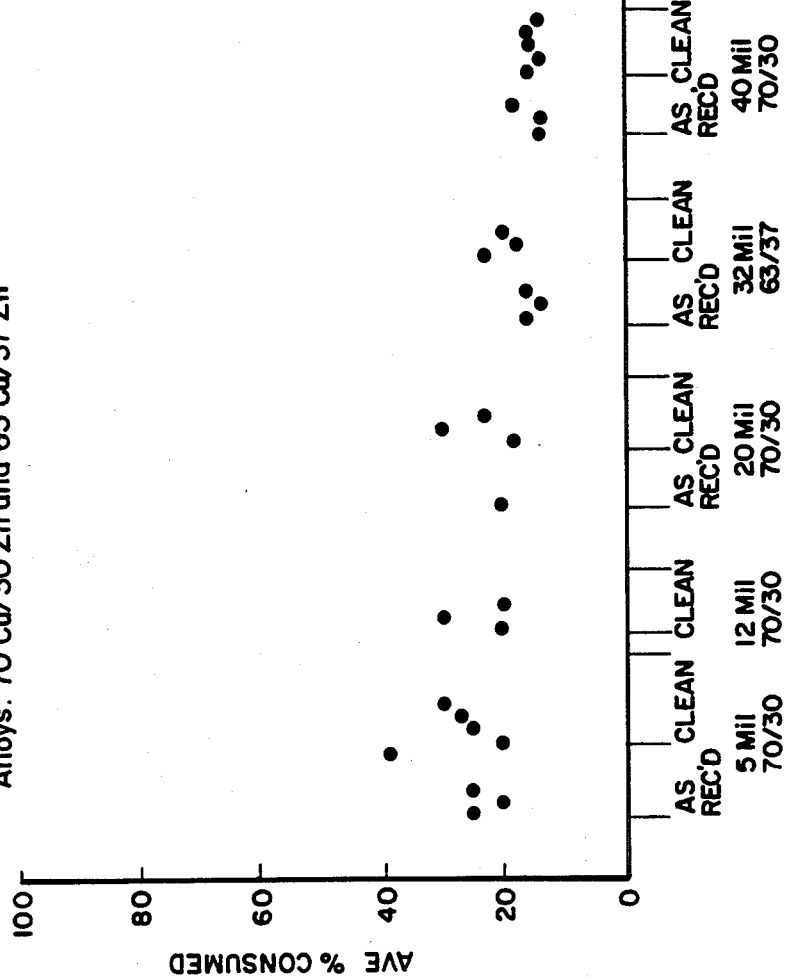

SUITABLE DISTILLATION COLUMN PACKING FOR THE CRYOGENIC SEPARATION OF AIR

This is a continuation of co-pending application Ser. No. 132,515, filed on Dec. 14, 1987, now abandoned.

TECHNICAL FIELD

This invention relates generally to a cryogenic process for the separation of an oxygen containing mixture to produce an enriched product by means of passing streams of liquid and vapor countercurrently through a mass transfer zone containing packing elements fabricated from thin material in order to effect vapor-liquid contact. The packing utilized is a copper-containing material having certain specified properties and characteristics.

BACKGROUND OF PRIOR ART

Mass transfer and distillation columns of various types have been known in the art for many years. Traditionally, enhanced vapor-liquid contact in columns of this type has been effected through the use, for example, of perforated or sieve trays whereby the rising vapor passes through openings, or through bubble caps, in trays on which a pool of the liquid is maintained at a significant depth. By this means, the vapor-liquid contact is controlled and enhanced.

Alternatively, it has been suggested that vapor-liquid contact can also be achieved through the utilization of packing elements in lieu of bubbling the vapor through pools of liquid on trays. Packing elements such as saddles and Raschig rings are well known in the art for such employment. Further, a variety of materials of fabrication for the trays and packing materials have been suggested. Illustrative of these are carbon steel, stainless steel, aluminum alloys, copper alloys, and plastics of various types.

It has also been recognized that certain of these materials are not universally suitable for all types of employment. Thus, for example, carbon steel and plastics generally become embrittled, and thus unsuitable, at cryogenic temperatures. On the other hand, however, costs have militated against the utilization of relatively scarce and expensive materials, such as copper. Aluminum alloys and stainless steel have, however, been widely utilized in the fabrication of trays for cryogenic air separation. In fact, stainless steel has been widely used in oxygen service (both liquid and gaseous) at pressures in excess of 3000 psig. Thus, it would appear that materials such as aluminum and stainless steel would be suitable candidates for fabrication of packing elements for use in cryogenic air separation columns.

We have discovered, however, that the utilization of materials previously found acceptable in cryogenic air separation are not suitable for utilization in the fabrication of packing elements when such packing is to be utilized in cryogenic air separation service. The primary reason for this is that certain materials which are acceptable when utilized in the form and in the manner traditionally employed do, however, present a risk of flammability when employed as packing elements in cryogenic air separation due again, to the form of the material and the conditions prevailing in the vapor liquid contacting apparatus. Thus, for example, stainless steel and aluminum have been utilized to fabricate trays, such as sieve trays, for use in distillation columns in cryogenic air separation service. Such trays, however, generally have a thickness in excess of about one millimeter and generally ranging up to two or three millimeters in thickness. Additionally, these trays usually contain a liquid inventory equivalent to a depth of 30 to 50 or more millimeters. The thickness of the tray alone militates against the propagation of combustion of the material, even in the presence of a relatively high concentration of oxygen, and the presence of the liquid inventory on the tray would act to quench the combustion reaction. As distinguished from this, the material used to fabricate packing elements is relatively thin and thus more susceptible to combustion. Further, the liquid being contacted with the vapor is in the form of a thin film on the surface of the elements, which film is several orders of magnitude thinner than the height of the liquid inventory on a tray.

SUMMARY OF THE INVENTION

We have discovered that materials previously utilized in cryogenic air separation and which would appear to be prime candidates for the fabrication of packing elements, in face, present a serious flammability problem in environments in which the concentration of oxygen is greater than that normally found in air, i.e., greater than about 21% by volume. We have also discovered, however, that cyogenic separation of oxygen-containing mixtures, including air, can be safely practices when certain defined materials are utilized as packing elements in the mass transfer or vapor-liquid contact zones. These packing elements can be random-type packings (such as saddles, Raschig rings and Pall rings) and can be ordered or structured-type packings. By structured or ordered packing is meant a packing which will promote liquid and vapor mixing in a direction perpendicular to the primary flow direction. Examples of ordered or structured packings are disclosed in U.S. Pat. Nos. 4,128,684; 4,186,159; 4,296,050; 4,455,399; 4,497,751; 4,497,752 and 4,497,753. Accordingly, we have developed a process for the cryogenic separation of oxygen containing mixtures, including air, to produce an enriched product whereby oxygen concentrations greater than 21% by volume are achieved in the process. Our process comprises passing streams of liquid and vapor countercurrently through a mass transfer zone which contains packing elements fabricated from a material having a thickness of less than about 1 millimeter. The vapor-liquid contact is effected between thin films of liquid on the surface of the packing elements and the vapor. In this process the packing elements are fabricated from a copper containing material which has a copper concentration of at least about 30% by weight. The material from which the packing elements are fabricated is to have a heat of reaction with oxygen at 20° C. of less than about 1.0 kcal/g.

BRIEF DESCRIPTION OF THE DRAWINGS

FIG. 5 is a plot of the data obtained in the performance of flammability screening tests on samples of copper alloys.

DETAILED DESCRIPTION

Figure 1:
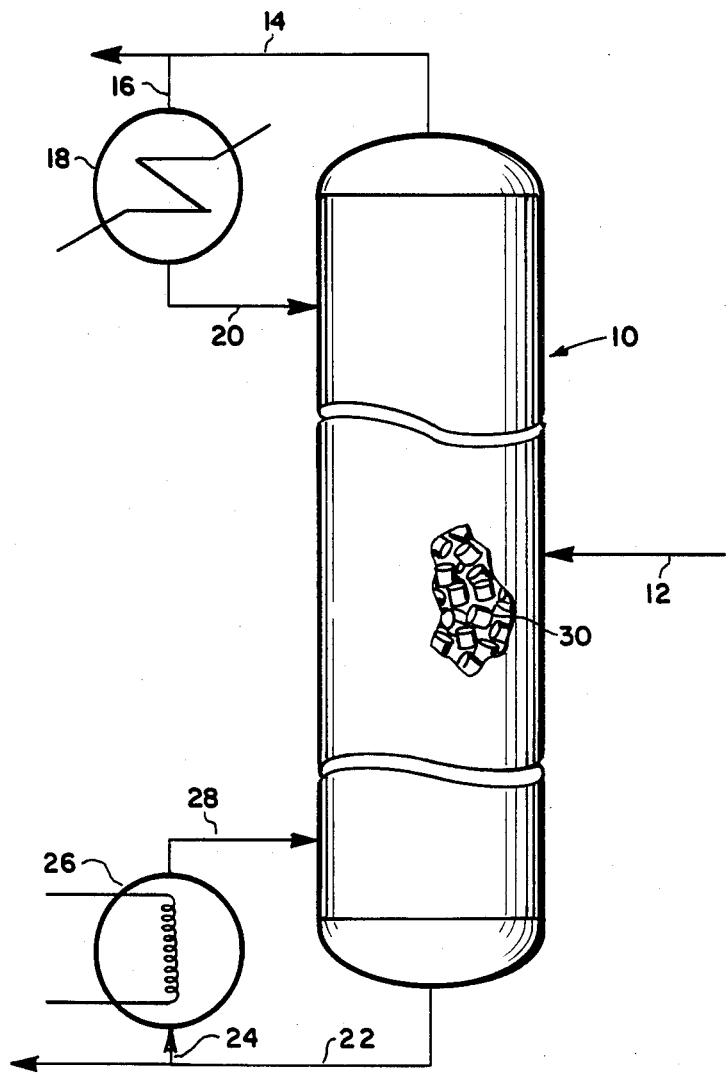
FIG. 1 is a simplified representation of an apparatus for the cryogenic separation of an oxygen containing mixture, specifically air, utilizing packing elements to effect vapor-liquid contacting in accordance with this invention.

The process of our invention is particularly useful wherein the packing element is fabricated from a material containing at least about 50% by weight copper and especially materials containing even higher concentrations of copper such as for example 55, 60, 65 and even 70% by weight copper. Particularly suitable materials have been found to be alloys containing from about 60 or 63% up to about 70% copper, e.g. brass. Obviously, the process of our invention can also be practiced utilizing packing materials having extremely high copper contents such as 85, 90 or higher. Commercial grades of copper containing 99%+ copper content are also quite suitable. Materials of the type described above are readily available commercially today and include various materials such as Monel, nickel silver, naval brass, cartridge brass, red brass, commercial brass, phosphor bronze and various commercial grades of copper.

The process of our invention is advantageously practiced when employing packing elements fabricated from materials having a thickness of less than about ½ millimeter and particularly less than about 0.30 millimeter. The process of our invention is especially advantageous in the employment of packing elements fabricated from materials having a thickness of less than about 0.20 millimeter.

Advantageously, the material from which the packing elements are to be fabricated can have a heat of reaction with oxygen at 20° C. of less than about 0.95 Kcal/g and even less than about 0.85 Kcal/g. It is particularly desirable to employ materials having a heat of reaction of less than about 0.80 Kcal/g.

As will be understood, the process of this invention becomes more advantageous as the oxygen concentration in the vapor phase increases. Thus, while the process of this invention is generally advantageous when the oxygen concentration is greater than that normally found in atmospheric air, greater than about 21% by volume, the process becomes more advantageous when the oxygen concentration in the vapor phase is greater than about 50% by volume. The process of our invention is particularly advantageous when the oxygen concentration in the vapor phase is greater than about 70% by volume and especially so when the concentration exceeds about 80 or even 95% by volume.

Generally, cyrogenic air separation processes are conducted at about atmospheric pressure, or just slightly above, and the advantages of the present process are obtainable at these relatively low pressures. Distillation can be practiced at pressures less than the critical pressure of the system. For typical oxygen-containing mixtures distillation can be effected at less than about 475 psig. From a process point of view it can be advantageous to utilize pressures of less than about 200 psig and particularly less than about 125 psig. The process of this invention can provide especially advantageous operation when employing pressures in the range of less than about 50 psig and particularly less than about 25 psig.

In the operation of the process of this invention, the liquid film on the surface of the packing elements is generally less than about 1 millimeter. The advantages of this invention are usually more readily manifest when the thickness of the liquid film on the packing elements is less than about ½ millimeter, particularly when it is less than about 0.25 millimeter, and especially when it is less than about 0.1 millimeter. At times the liquid film can be as thin as 0.05 or even 0.025 millimeter.

In selecting the material from which the packing elements in the present process are fabricated, such materials generally have a specific area of at least about 300 square meters per cubic meter of packing elements. Preferably, the specific area of the packing material is at least about 400 square meters per cubic meter and it is particularly preferred to utilize a material having a specific area of at least about 500 square meters per cubic meter and especially greater than about 600 square meters per cubic meter. Additionally, the packing elements are fabricated so as to have a bulk density of less than about 1,000 kilograms per cubic meter, preferably less than about 700 kilograms per cubic meter, and especially less than about 400 kilograms per cubic meter.

Generally, the interrelationship between the specific area and the bulk density of the packing material is determinative of the thickness of the material to be employed. Thus, the thickness of the packing material can be calculated by the equation:

$$\tau_m = (\pi_B/\pi_m) \times (2/K_s)$$

wherein $\tau_m$ is the thickness of the material in meters, $p_m$ is the density of packing fabrication material in kg/M³

$K_s$ is the specific area M²/M³

$p_B$ is bulk density of packing kg/M³.

Referring now to FIG. 1, there is shown a mass transfer column 10 utilized for cryogenic air separation. Pretreated dry oxygen-containing gas is introduced into column 10 by means of line 12. Within column 10, a pressure maintained at less than about 150 psig, and preferably less than about 50 or even 25 psig, is maintained, liquid and vapor are contacted with each other in a countercurrent fashion with the vapor rising within column 10 and being removed therefrom by means of line 14 as a nitrogen enriched stream. A portion of the vapor from line 14 is passed by means of line 16 to cooler 18 where it is condensed to form reflux liquid which is returned to column 10 by means of line 20. The liquid flows downwardly within column 10 countercurrent to the upwardly flowing vapor and the oxygen enriched liquid is removed from column 10 by means of line 22. A portion of the liquid in line 22 is passed, via line 24, to reboiler 26. There it is heated and vaporized and the vapor is returned to the column 10 by means of line 28. This vapor flows upwardly within column 10 countercurrently to the liquid.

Within column (as shown by cutaway) is packing material 30 having a specific area of greater than about 350 square meters per cubic meter and a bulk density of less than about 375 kilograms per cubic meter. As illustrated in FIG. 1, the packing material provides means for the liquid to flow downwardly in the form of thin films of less than about about 0.15 millimeter on the surface of the packing material, while permitting the vapor to flow upwardly between the packing elements resulting in contact between the countercurrently flowing liquid and vapor. The material of fabrication of the packing elements utilized is as described in this invention.

EXAMPLES

In order to demonstrate the relative flammability of different materials, test specimens of various materials were subjected to testing in an apparatus which will be described in connection with FIG. 2.

Figure 2:
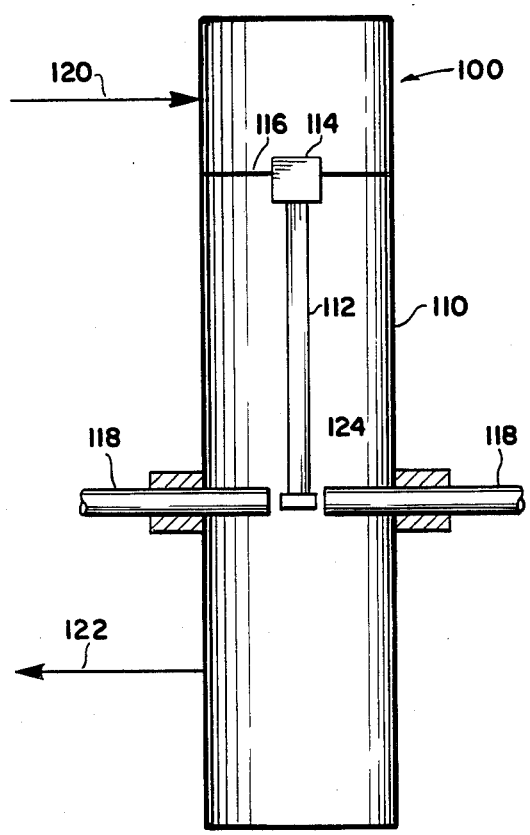
FIG. 2 is a schematic representation of the type of test apparatus utilized in screening materials for use as packing in this invention.

Referring now to FIG. 2, the test apparatus 100 generally consisted of a vertical test vessel 110 of 41 mm inside diameter. The test specimens 112 were mounted coaxially within the vessel 110 by being held by mounting block 114, which in turn was supported by mounting brackets 116 affixed to the interior of test vessel 110. The lower end of the test specimen 112 was located 50 mm above the midpoint of test vessel 110 between a pair of electrodes 118 used for ignition. Molten slag and burning metal were collected in the bottom of test vessel 110.

Two separate test vessels 110 were used in the following Examples. One was a brass vessel rated for pressures up to 2.2 MPa (315 psi). The other was stainless steel vessel with a brass liner having the same internal dimensions but rated for 10.4 MPa (1515 psi).

A gas supply system (not shown), including an $O_2$ analyzer to measure the composition of blended feed gas mixtures and a chromatograph to analyze premixed gases, provided metered flows of feed gas comprised $O_2$ and diluent to the top of the test vessel 110 by means of gas inlet line 120. This feed gas was supplied at a temperature of 25° C. Gas was removed from test vessel 110 at a point below the lower end of test specimen 112 by means of gas outlet line 122 and passed to a backpressure regulator (not shown) used to control the pressure in test vessel 110.

Generally, the test specimens 112 were 2¾ to 3 in. long. A promoter or igniter 124 was attached to the bottom 4.8 mm of the test specimen 112. The two opposing electrodes 118 were pressed against the igniter 124 by pneumatic cylinders (not shown) and a direct current was passed through it for about one second. In this manner the test specimens 112 were ignited at the bottom so that combustion propagated upwards. This configuration permitted the molten slag and burning metal to fall away from the test specimen 112, giving more accurate and reproducible results.

EXPERIMENTAL PROCEDURE

In the following Examples, the igniter or promoter 124 was applied to the bottom of a test specimen 112 to be tested and the test specimen 112 was mounted in mounting block 114 within the test vessel 110. Test vessel 110 was closed and the inlet gas flow through line 120 was started. The gas component flow rates and the pressure were adjusted to the desired values. The system was purged until the effluent gas composition from line 122 and the total gas flow were constant at the desired values. For all Examples, the total gas flow was set to 0.33 standard liter/s, giving gas velocities of 250 mm/s (0.8 ft/s) at 100 kPa (14.7 psi) to 12 mm/s (0.04 ft/sec) at 10.4 MPa (1515 psi). Reynolds numbers were in the range of 640 to 670, based on the 41 mm inside diameter of the vessel. When all conditions were set, the electrodes 118 activated and the test commenced.

After each test, the test specimen 112 was removed for examination and the remaining, unconsumed portion (if any) of the test specimen 112 was measured and the length thereof recorded.

EXAMPLE I

In this example a series of 304 stainless steel test specimens having a heat of combustion with oxygen at 20° C. of 1.9 Kcal/g were subjected to flammability testing employing a mixture of gaseous oxygen and argon at a pressure of 25 psig. The test specimens were 2¾ inches long by 0.5 inch wide and 0.004 inch (0.1016 mm) thick. The igniters employed for the tests utilizing oxygen concentrations in the range from 67 to 80% by volume were 4 wraps of 5 mil steel and the igniter employed for the tests utilizing 66% by volume oxygen were 2 mil steel with steel wool or magnesium. The tests of this example were conducted in the manner described above and the measurements of the test specimens are plotted in FIG. 3.

Figure 3:
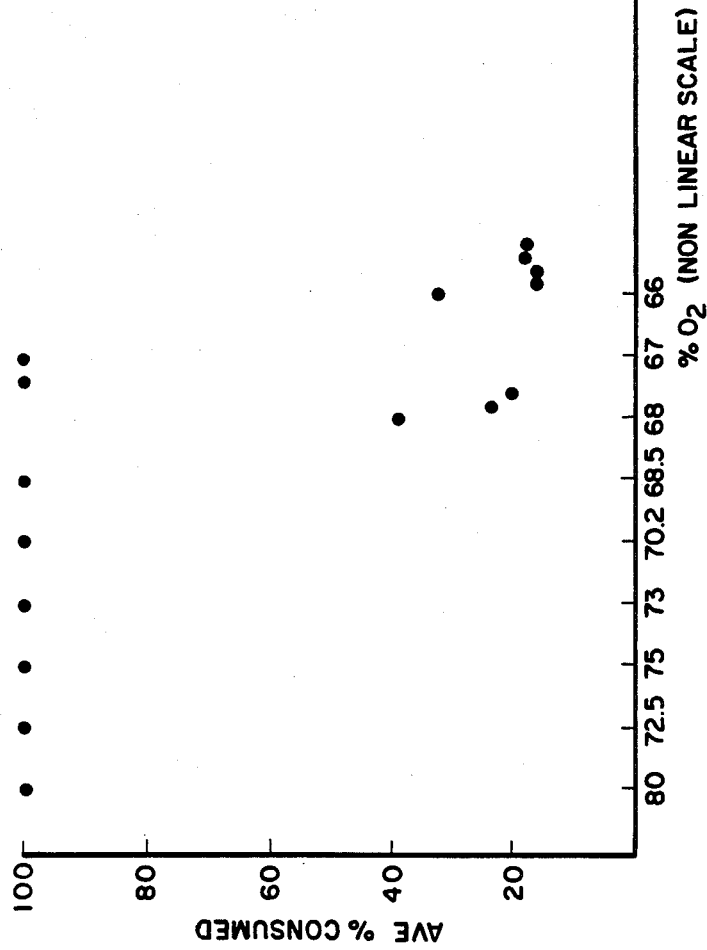
FIG. 3 is a plot of the data obtained in the performance of flammability screening tests on samples of stainless steel.

In connection with the data shown in FIG. 3 it should be pointed out that at below 67% oxygen, even though the igniter was changed from 5 mil carbon steel to only 2 mil carbon steel, it was necessary to utilize either magnesium wire or steel wool as an additional promoter to get the carbon steel igniter to ignite. These difficulties in getting the igniter to fire may have resulted in less than complete consumption of the test specimens. This prevented an assessment of the safety and suitability of the use of stainless steel in the regions below about 67% oxygen.

EXAMPLE II

In this example a series of 3003 aluminum test specimens having a heat of combustion with oxygen at 20° C. of about 7.4 Kcal/g were subjected to flammability testing employing a mixture of gaseous oxygen and argon at a pressure of 25 psig. The test specimens were 2¾ inches long by 0.5 inch wide and 0.008 inch (0.2032 mm) thick. The igniters employed for the tests utilizing oxygen concentrations of 78% by volume and greater were 1 wrap of 5 mil steel, the igniters employed for the tests utilizing from 74 to 78% by volume oxygen were 5 mil steel with added magnesium wire, and the igniters employed for the tests utilizing from 72% by volume oxygen and less were 2 mil steel with added magnesium wire. The tests of this Example were conducted in the manner described above and the measurements of the test specimens are plotted in FIG. 4.

Figure 4:
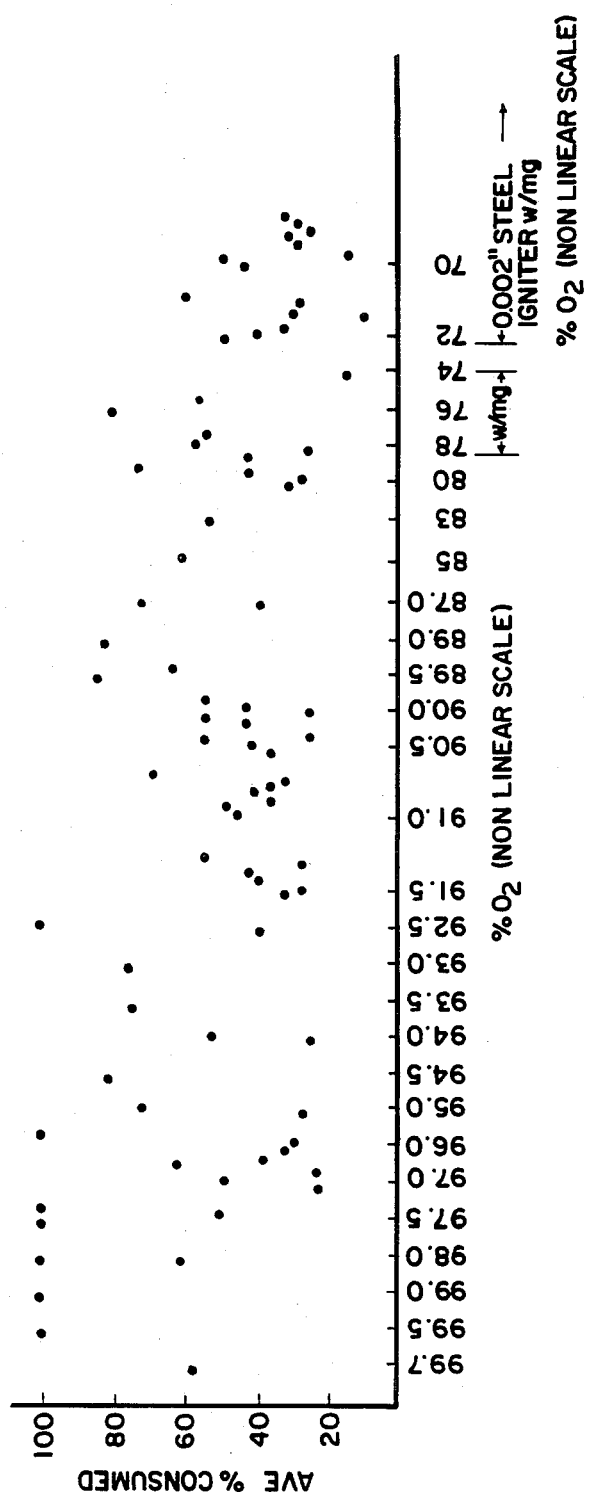
FIG. 4 is a plot of the data obtained in the performance of flammability screening tests on samples of aluminum.

In connection with the data shown in FIG. 4 it will be noted that there was significant and complete combustion of test specimens in oxygen atmospheres greater than about 92% and especially greater than about 95% Also it will be noted that substantial consumption of test specimens was achieved in oxygen atmospheres going down to about 70% oxygen. Further it will be noted that magnesium was again utilized to assist in firing the igniter because of the difficulties in getting complete combustion of the igniter. This presented the same difficulties as in Example I in reaching as assessment of the safety and suitability of the use of aluminum in the regions below about 70% oxygen.

EXAMPLE III

In this example a series of brass test specimens having different copper contents were subjected to flammability testing employing substantially pure gaseous oxygen (99.99% by vol.) at a pressure of 1500 psig. The test specimens were 3 inches long by 0.5 inch wide and ranged from 0.005 inch (0.1270 mm) to 0.04 inch (1.016 mm) thick. The test specimens having a copper content of 70% by weight had a heat of reaction with oxygen at 20° C. of 0.79 Kcal/g, while the test specimens having a copper content of 63% by weight had a heat of reaction with oxygen of 0.84 Kcal/g. The igniters employed for all of the tests were 4 wraps of 5 mil carbon steel. The tests of this example were conducted in the manner described above and the measurements of the test specimens are plotted in FIG. 5.

The conditions employed in this example were quite severe in the area of pressure and oxygen concentration so as to provide an extremely rigorous evaluation of copper alloys. In connection with the 40 mil test specimens it will be noted that some consumption of the test specimens did occur. This is due almost entirely to the amount of the specimen consumed by the burning of the igniter and not due to any significant combustion of the test specimen itself. It will be noted that there is a slight increase in the amount of other specimens consumed and that this increase is related to the thickness of the specimens. It must be pointed out that the amount of energy released by the igniter is substantial compared to the amount of energy required to melt a portion of the test specimen. Thus, the loss of material is primarily attributable to melting.

EXAMPLE IV

Testing of other copper alloys, such as red brass (85% Cu; 0.69 Kcal/g), nickel silver (55% Cu; 0.78 Kcal/g), Monel (31.5% Cu; 0.9 Kcal/g) and naval brass (60% Cu; 0.86 Kcal/g), in a similar manner to that described in the previous examples indicates low flammability and, therefore, suitability for use in the cryogenic air separation process of this invention.

We claim:

1. A process for the cryogenic separation of oxygen containing mixtures to produce an enriched product whereby oxygen concentrations greater than 21 per cent by volume are achieved in the process which comprises passing streams of liquid and vapor countercurrently through a mass transfer zone containing packing elements fabricated from a material having a thickness of less than about 1 mm and effecting vapor-liquid contact between thin films of liquid on the surface of the packing elements with vapor, the packing elements being fabricated from a copper containing material having a copper concentration of at least about 30% by weight and a heat of reaction with oxygen at 20° C. of less than about 1 Kcal/g.

2. The process of claim 1 wherein the packing material has a copper concentration of at least about 50% by weight.

3. The process of claim 1 wherein the material from which the packing elements are fabricated has a thickness of less than about 0.5 mm.

4. The process of claim 1 wherein the oxygen concentration is greater than about 50 per cent by volume.

5. The process of claim 1 wherein the heat of reaction with oxygen at 20° C. is less than about 0.9 Kcal/g.

6. The process of claim 1 wherein the superatmospheric pressure is less than about 475 psig.

7. The process of claim 1 wherein the packing material has a specific area of at least about 300 square meters per cubic meter.

8. The process of claim 1 wherein the packing material has a bulk density of less than about 1000 Kilograms per cubic meter.

9. The process of claim 1 wherein the thickness of the material from which the packing elements are fabricated is no greater about 0.3 millimeter.

10. The process of claim 1 wherein the thickness of the liquid film on the surface of the packing is less than about one-half millimeter.

* * * * *